United States Patent [19]
Buhrmann et al.

[11] Patent Number: 5,854,984
[45] Date of Patent: Dec. 29, 1998

[54] RADIO TELEPHONE WITH DETACHABLE PAGER

[75] Inventors: Michael Buhrmann, Redmond; Jane Montemayor, Bellevue, both of Wash.

[73] Assignee: AT&T Wireless Services Inc, Middletown, N.J.

[21] Appl. No.: 576,385

[22] Filed: Dec. 21, 1995

[51] Int. Cl.[6] .................................................. H04Q 7/08
[52] U.S. Cl. .......................... 455/550; 455/556; 455/575; 455/31.3; 340/825.44
[58] Field of Search ...................................... 455/556, 557, 455/550, 575, 415, 426, 31.2, 31.3, 552, 586, 90; D14/138; 340/825.44, 466; 370/393, 394, 395, 396

[56] References Cited

U.S. PATENT DOCUMENTS 5,148,473  9/1992  Freeland ................................... 455/556
5,541,976  7/1996  Ghisler ..................................... 455/31.3

FOREIGN PATENT DOCUMENTS 408168080A  6/1996  Japan.

*Primary Examiner*—Dwayne D. Bost
*Assistant Examiner*—Keith Ferguson

[57] ABSTRACT

A radio telephone and pager system includes a radio telephone handset and a pager that detachably mounts to the handset. The pager employs a transceiver that provides both paging service, such as a messaging service, and radio telephone service, such as cellular service, when the pager is mounted. Also, the transceiver provides the pager service when the pager is detached. The invention achieves a reduction in a number of components while enabling subscribers to use a single telephone system to provide both a radio telephone and a stand-along pager.

22 Claims, 3 Drawing Sheets

RADIO TELEPHONE WITH DETACHABLE PAGER

FIELD OF THE INVENTION

This invention relates to radio telephones and pagers.

BACKGROUND OF THE INVENTION

Presently, most subscribers to both radio telephone and pager services use separate radio telephone and pager units. As a consequence, these subscribers must carry both units in order to receive pager messages and establish radio telephone calls. However, the carrying of both units adversely affects portability and is often cumbersome and inconvenient.

U.S. Pat. Nos. 5,109,539 and 5,438,701 disclose combined radio telephone and pager apparatus wherein both radio telephone and pager components are contained in single units. These apparatus provide improved portability and convenience when a subscriber requires use of both the radio telephone and pager service. However, often times, a subscriber needs only the use of pager messaging service. In such instances, the subscriber is undesirably burdened with carrying the combined apparatus which is much larger and more cumbersome than conventional pager units. Moreover, these combined components use separate transceiver circuits for the radio telephone and the pager components such that they are effectively separate radio telephone and pager units contained in a single housing. As a result, these combined devices are as costly to manufacture as separate telephone and pager units.

British published patent application no. 2,269,072 discloses a portable telephone having a pager incorporated into a power pack that is detachable from the telephone. However, as in the previously described patents, the portable telephone uses separate transceivers for the telephone and pager units. Moreover, a power pack having sufficient power capacity for a portable telephone is typically larger, heavier and bulkier than conventional pagers. Accordingly, the power pack pager unit of the British application would likely be disadvantageously heavier and more bulky than conventional pagers.

Thus, a need exists for a radio telephone having a detachable pager of compact dimensions that is relatively inexpensive to manufacture.

SUMMARY OF THE INVENTION

A radio telephone and pager system includes a radio telephone handset and a pager that detachably mounts to the telephone handset. The pager employs a transceiver that is capable of providing pager service and wireless telephone communications. Accordingly, when the pager is detached, the transceiver enables the pager to operate as a stand alone pager, and when mounted to the telephone handset, the transceiver enables the system to operate as a pager as well as to place and receive radio telephone calls.

It is possible for such a system to provide telephone and short message service using, for example, time division multiple access (TDMA) communication in accordance with the Telecommunications Industry Association and the Electronic Industries Association Interim Standard 136 (TIA/EIA/IS-136), Group Speciale Mobile (GSM) or Personal Handyphone System (PHS) standards, or using code division multiple access (CDMA) communication in accordance with the TIA/EIA/IS-95.

Since the pager component contains the transceiver for the telephone service, the handset need only contain those additional components required for telephone operating such as an earpiece speaker, mouthpiece microphone and a keypad. As a result, the invention advantageously reduces the number of components used to manufacture the system while enabling subscribers to use a single telephone system to provide both a radio telephone and a stand-alone pager. Accordingly, the reduced number of components enables the handset and detachable pager to be manufactured in respective housings of compact dimensions.

The invention provides a convenience to subscribers of carrying the system when both messaging and radio telephone services are required or to detach the compact pager when only pager messaging service is required. Such convenience is provided by the invention without the bulk and weight of conventional radio telephone and pager systems that employ separate transceivers.

In one embodiment, a further reduction in parts and dimensions is achieved by employing a pager display that provides user information for both radio telephone and pager services. Further, it is possible to use a pager mounting position between a telephone handset earpiece speaker and mouthpiece microphone to provide a convenience in the use of the display during telephone operation.

Additional features and advantages of the invention will become more readily apparent from the following detailed description and accompanying drawings.

DETAILED DESCRIPTION

The invention concerns a radio telephone and pager system having a radio telephone handset and a pager that is detachably mountable to the handset. In this radio telephone and pager system, a single transceiver is employed in the pager that is capable of providing pager service, as well as establishing and receiving radio telephone calls when the pager is mounted to the handset. Since the pager contains the transceiver for the telephone service, the handset need only contain those additional components required for telephone operating such as an earpiece speaker, mouthpiece microphone and a keypad. As a result, the invention advantageously reduces the number of components used to manufacture the system while enabling subscribers to use a single telephone system to provide both a radio telephone and a stand-alone pager. The following description and accompanying drawings concern an exemplary embodiment of such a system for illustration purposes only and is not meant to be a limitation of the invention. Many different radio telephone and pager configurations can be constructed in accordance with the invention.

Figure 1:
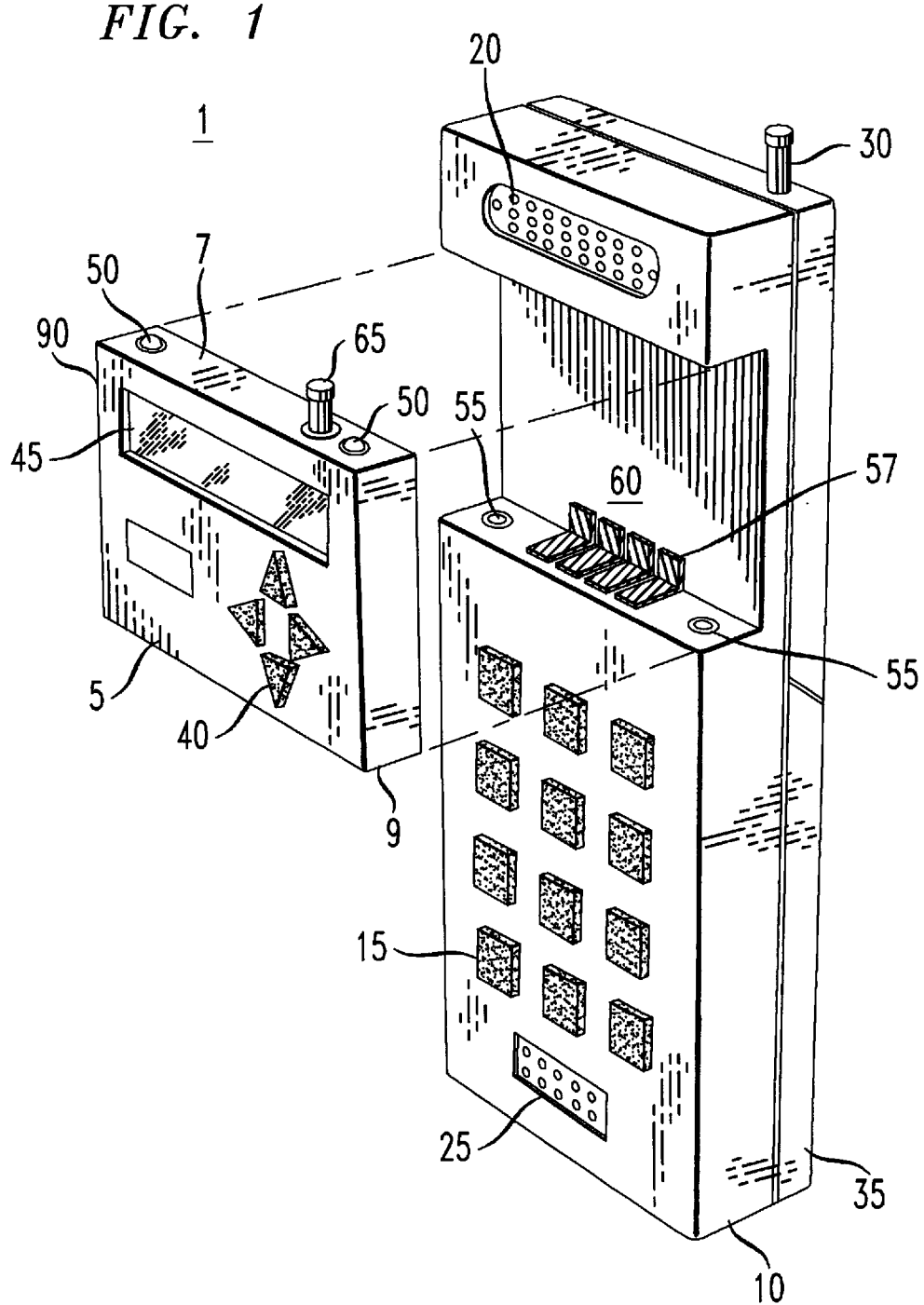
FIG. 1 is a perspective view of an exemplary radio telephone and pager system with the pager in a detached position.
Figure 2:
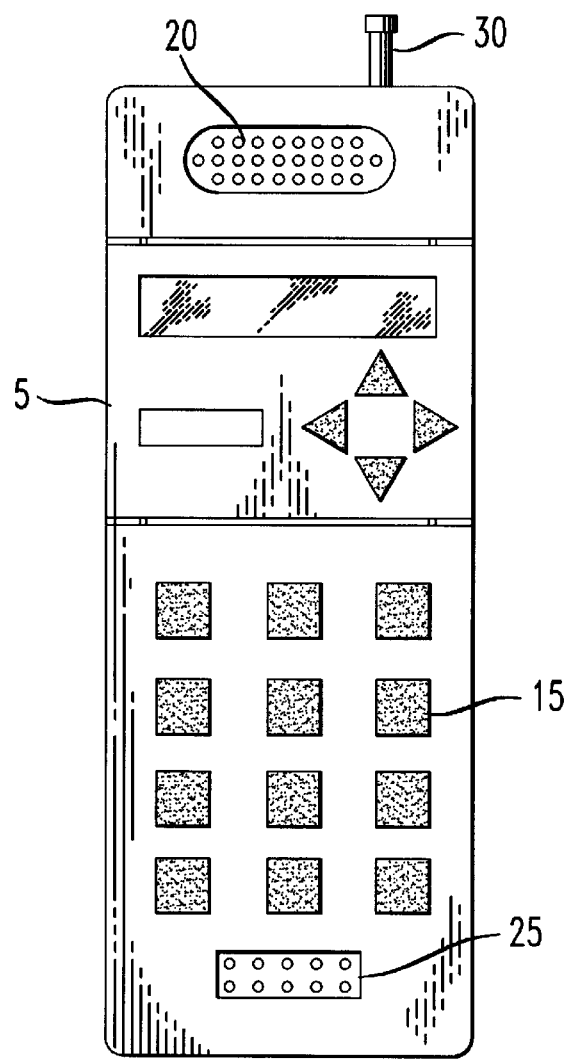
FIG. 2 is a perspective view of the radio telephone and pager system of FIG. 1 with the pager in a mounted position.

FIGS. 1 and 2 depict an exemplary radio telephone and pager system 1 in accordance with the invention. FIG. 1 shows a pager 5 detached from a radio telephone handset 10 and FIG. 2 shows the pager 5 detachably mounted to the radio telephone handset 10. A rear view of the pager 5 is shown in FIG. 3.

Referring to FIGS. 1 and 2, the pager 5 has control keys 40 and a display 45 in a housing 90. The control keys 40 enable a subscriber to scroll and manipulate pager messages and other user information displayed on the display 45. If the pager 5 is a two-way pager, then the control keys 40 can also be used by the subscriber to transmit a response to a received message. It is possible for the control keys 40 and display 45 to be substantially identical to such components used in conventional pagers. Although the pager 5 is depicted in FIGS. 1–3 having a form substantially similar to conventional pagers, it should be readily understood that the pager 5 can be in various other forms including, for example, a "smart card" or a Personal Computer Module Computer Industry Association (PCMCIA) card.

Figure 3:
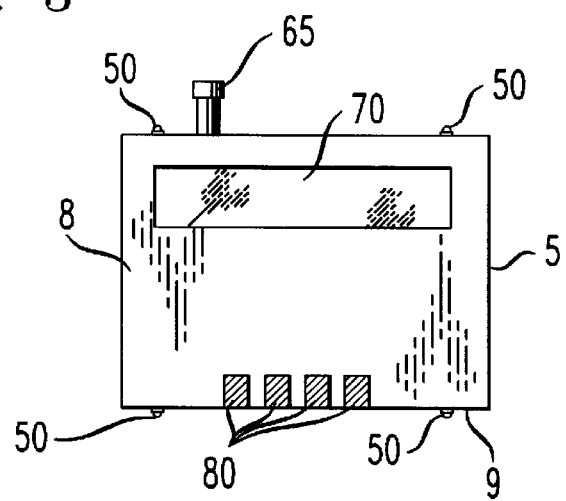
FIG. 3 is a rear view of the pager of FIGS. 1 and 2.

Further, as shown in FIGS. 1 and 3, mounting mechanisms 50, such as conventional spring-operated dome-type detents, are disposed on top and bottom edges 7 and 9 of the pager 5 to enable the detachable mounting of the pager 5 to the handset 10 which is described in greater detail below. The pager 5 has a power source such as a battery pack 70 and contacts 80 disposed on a rear side 8 as shown in FIG. 3. The contacts 80 enable communications between the pager 5 and the telephone handset 10 and can further wrap-around the rear-side 8 to the edge-surface 9.

It is possible for the pager 5 to have a retractable antenna 65 which is retracted when the pager 5 is mounted to the handset 10 and is extendible when the pager 5 is detached from the handset 10 and operated as a stand-alone pager. It should be readily understood that the retractable operation of the antenna 65 is for illustration purposes only and is not meant to be a limitation on the invention. It is alternatively possible to use, for example, an antenna mounted internal to the pager 5.

Moreover, the telephone and pager system 1 can employ a single retractable antenna disposed in the pager 5, such as the antenna 65, which is retracted when the pager 5 is detached and which is extendible into a recess that extends partially or fully through the handset 10 when the pager 5 is mounted. Such a single antenna, when extended, can provide enhanced gain for wireless telephone communications when the pager 5 is mounted to the handset 10. Also, it is possible to employ a fixed antenna that fits into a corresponding recess within the handset 10 instead of such a single retractable antenna.

The radio telephone handset 10 has a keypad 15, earpiece speaker 20, mouthpiece microphone 25, antenna 30 and a power source such as a battery pack 35, best seen in FIGS. 1 and 2. It is possible, for the keypad 15, speaker 20, microphone 25, antenna 30 and battery pack 35 to be substantially identical to such components used in a conventional radio telephone such a, for example, cellular telephone model Nos. 3810, 3850 and 6650 manufactured for AT&T Corp. Although the telephone handset 10 and pager 5 are illustrated using separate antennas 30 and 65, it should be readily understood that it is alternatively possible to employ a single antenna coupled to the pager 5 that possesses sufficient signal gain for transmission and reception of radio telephone and pager signals. An exemplary antenna gain for such an antenna can be that of a conventional cellular telephone antenna in the approximate range of 0 to 3 dB.

A mounting position for the pager 5 on the handset 10 is in a receptacle 60. The depicted pager mounting position is between the handset earpiece speaker 20 and mouthpiece microphone 25. Mounting mechanisms 55, such as slots, are disposed proximate the receptacle 60 to engage the pager mounting mechanisms 50 for securing the pager 5 to the handset 10. As shown in FIG. 1, contacts 57 are also disposed in the receptacle 60 and correspond to the pager contacts 80, shown in FIG. 3, to enable communications between the pager 5 and handset 10 when the pager 5 is mounted. Suitable contacts 57 and 80 include, for example, electrical or optical contacts.

Although the illustrated pager mounting position is in the receptacle 60, it should be readily understood that other mounting positions can be used in accordance with the invention including, for example, mounting the pager 5 on a non-recessed surface of the handset or within the handset. Further, although the system 1 of FIGS. 1 and 2 uses detents and slots for the mounting mechanisms 50 and 55 it should be readily understood that various different mounting mechanisms can be used in accordance with the invention including, for example, those that slidably attach the pager 5 to the handset 10 and that mount the pager 5 internal to the handset 10. Also, the pager 5 can be rotatably mountable to a respective end of the handset as a flip-element to allow the pager 5 to rotate or out from the handset 10 in a similar manner to flip-elements of conventional cellular "flip-phones" such as those telephones manufactured by Motorola.

Figure 4:
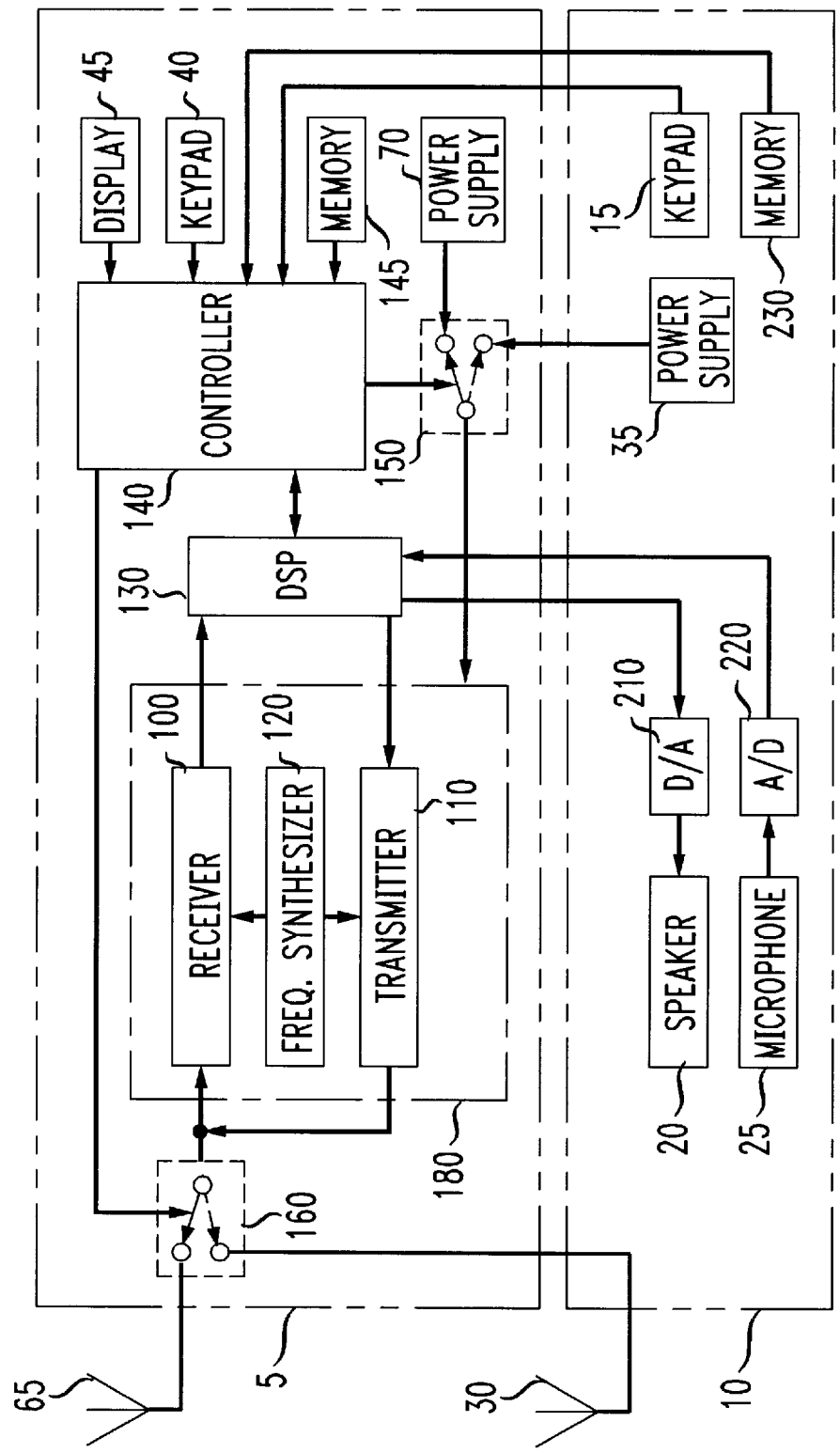
FIG. 4 illustrates a schematic block diagram of an exemplary radio telephone pager system circuit for use in the system of FIGS. 1 and 2.

FIG. 4 shows exemplary circuit components that can be included in the radio telephone and pager system 1. Similar components in FIGS. 1–4 are like numbered for clarity, for example, the display 45 and telephone and pager keypads 15 and 40. In addition, the exemplary components disposed within the pager 5 of FIGS. 1–3 are contained within a corresponding outline 5 in FIG. 4. Likewise, the exemplary components disposed within the telephone handset 10 of FIGS. 1 and 2 are contained within a corresponding outline 10 in FIG. 4. The components of FIG. 4 enable communication with digital wireless telephone and pager services which is not meant to be a limitation of the invention. It should be readily understood that system components that enable communications with analog telephone and/or pager services or otherwise can also be employed in accordance with the invention.

It is possible for the components of the pager 5 to provide time division multiple access (TDMA) communications, or code division multiple access (CDMA) communications. For instance, if the components provide TDMA it is possible for the system components to provide dual-band communications operating at frequency bands of, for example, 800 MHz and 1900 MHz, according to the Telecommunications Industry Association and the Electronic Industries Association Interim Standard 136 (TIA/EIA/IS-136). In accordance with this standard, short messaging service is provided for pagers on a digital control channel while wireless digital telephone communications is provided over digital traffic channels. The TIA/EIA/IS-136 standard is described in greater detail in "Cellular System Dual—Mode Mobile Station —Base Station Compatibility", Telecommunication Industry Association PN3011-1 (Double Tree Suites, Seattle, Wash. 1994), which is incorporated by reference herein. A suitable dual-band transceiver is described in, for example, commonly-assigned U.S. Patent Application entitled "RADIOTELEPHONE TRANSCEIVER OPERATIVE OVER MORE THAN FREQUENCY RANGE", Ser. No. 08/576,119, Attorney Docket No. Berthelmes 1-24-2-14, contemporaneously filed herewith and incorporated by reference herein.

It is alternatively possible for the pager components to provide TDMA communications in accordance with the Group Speciale Mobile (GSM) standard of Europe or the Personal Handyphone System (PHS) standard of Japan which provide wireless telephone service and short message service capability similar to that provided by the previously described TIA IS-136 standard. A description of the GSM standard is described in, for example, G. Martini and G. Rosenga, "Distributed Architecture for Applications based on the GSM Short Message Service", *Second International Workshop on Services in Distributed and Network Environments, IEEE Computer Society Technical Committee on Distributed processing*, pp. 140—145 (June, 1995), which is incorporated by reference herein.

It is further possible for the system components to provide CDMA communications messaging and wireless telephone communications according, for example, to a TIA/EIA/IS-95 standard which is described in detail in "Mobile Station —Base Station Compatibility Standard for Dual—Mode Wideband Spread Spectrum Cellular System", TIA/EIA/IS-95 (Global Engineering Documents, Englewood, Colo. July 1993), which is incorporated by reference herein. Also, pager components that transmit and receive conventional analog paging and wireless telephone signals can be employed in the pager 5. Moreover, if the pager components provide access to three or a greater number of communication bands, then the telephone and pager system 1 can communicate with additional telephone and/or pager services. For instance, if suitable tri-band communications are provided by the pager components, then the system 1 could provide narrow band personal communication service (NBPCS) for telephone communications and/or pager messages in addition to providing such communications and/or messages in accordance with another communication standard such as the TIA/EIA/IS-136 standard.

Referring to FIG. 4, the exemplary pager 5 contains a receiver 100, transmitter 110, frequency synthesizer 120, digital signal processor (DSP) 130, controller 140, memory 145, and first and second controllable switches 150 and 160. The pager antenna 65 and telephone antenna 30 can be coupled to the receiver 100 and transmitter 110 by the second switch 160. The position of the switch 160 is controlled by the controller 140 to couple the particular one of antennas 30 and 65 to the receiver 100 and transmitter 110 as required during system operation.

The receiver 100 and transmitter 110 are further coupled to the frequency synthesizer 120. The frequency synthesizer 120 provides proper modulation and demodulation frequencies for the receiver 100 and transmitter 110. The receiver 100, transmitter 110 and frequency synthesizer 120 form a transceiver as denoted by an outline 180. The transceiver receiver 100 and transmitter 110 are coupled to the DSP 130 which is also coupled to the controller 140. The DSP 130 provides encoding and decoding of signals. It is possible for the components of the transceiver 180 to provide TDMA communications, such as in conformance with the TIA IS-136, or CDMA communications, such as in conformance with the TIA IS-95. In the instance of the CDMA communications, the DSP 130 can be considered as part of the transceiver 180. In an alternative embodiment, the DSP 130 or its functions can be incorporated into the controller 140 as either circuitry or software.

The memory 145 is also coupled to the controller 140. The memory 145 can contain identification information that can be used by the controller 140 to identify those pager messages transmitted by a service provider that are intended for the pager 5. The controller 140 further receives signals from the pager keypad 40 and provides control and/or display information to the display 45. A suitable controller 140 includes, for example, a microprocessor, microcontroller or application specific integrated circuit (ASIC) that is suitably configured and/or programmed to control operations of the pager 5 alone and the system 1.

The controller 140 controls the first switch 150 for providing power to the transceiver 180 from the pager power supply 70 or from the handset power supply 35 when the pager 5 is mounted to the handset 10. Suitable power supplies for the power supply 35 include, for example, rechargeable batteries such as nickel cadmium (nicad), lithium or nickel metal hydroxide batteries which provide sufficient transmission power in conventional portable cellular telephones. However, conventional batteries of these types would likely be too large and bulky for use as the pager power supply 70. It is desirable for the pager 5 to be relatively small and light weight for ease of portability when detached from the handset 10. As a consequence, smaller conventional batteries, such as alkaline batteries, which often provide power to conventional pagers, can be employed in the power supply 70.

Accordingly, the system 1 can rely on the handset power supply 35 when the pager 5 is mounted, and the pager power supply 70 when the pager 5 is detached or operating to receive pager messages. In an alternative arrangement, mechanical mechanisms can be used to connect the power supply 70 to the transceiver 180 when the pager 5 is detached and to connect the power supply 35 to the transceiver 180 when the pager 5 is mounted. The use of two power supplies is not critical to practicing the invention. Thus, it is possible for the handset power supply 35 and the second switch 150 to be omitted while the pager power supply 70 provides power to the transceiver 180 whether the system 1 is providing telephone or pager service. In such an embodiment, it is possible to include a power booster in the handset 10 to provide increased if required for telephone communications.

In addition to the power supply 35, the telephone handset 10 contains a digital-to-analog (D/A) converter 210 coupled to the earpiece speaker 20, a analog-to-digital (A/D) converter 220 coupled to the mouthpiece microphone 25 and a memory 230. When the pager 5 is mounted to the handset 10, the D/A and A/D converters 210 and 220 are further coupled to the DSP 130. Also when mounted, the telephone handset keypad 15 and memory 230 are coupled to the pager controller 140. The respective components of the telephone handset 10 can be coupled to the respective components of a mounted pager 5 via the contacts 57 and 80, shown in FIGS. 1 and 3.

When the pager 5 is mounted to the telephone handset 10, the system 1 is capable of providing telephone and pager service in the following manner. The controller 140 causes the first switch 160 to couple the telephone antenna 30 to the transceiver 180. The receiver 100 demodulates a received signal from the coupled antenna 30 into a baseband digital signal using a suitable demodulation frequency received from the frequency synthesizer 120. The receiver 100 can also amplify the digital signal prior to or after demodulation as required by the DSP 130. The DSP 130 provides the necessary decoding of the digital signal based on a communications protocol used by the system 1.

If the digital signal contains voice data then the controller 140 controls the DSP 130 to route the decoded digital voice signal to the D/A converter 210 in the telephone handset 10. The D/A converter 210 converts the digital voice signal to an analog signal which is provided to the speaker 20 that produces corresponding sound for the subscriber. In the alternative, if the decoded digital signal is a pager message then the controller 140 receives the message and displays it on the display 45. It is possible for the controller 140 to determine the type of data contained in the digital signal based on, for example, the transmission channel on which it was transmitted and/or header or trailer information in the digital signal.

The system 1 can transmit a signal corresponding to the users voice during a telephone conversation by converting the spoken sounds to an analog signal using the microphone 25. This analog signal is converted to digitized signal by the A/D converter 220 which is provided to the DSP 130. The DSP 130 then encodes the digitized voice signal and provides it to the transmitter 110. The transmitter 110 modulates the encoded signal using a suitable modulation frequency from the frequency synthesizer 120. The transmitter 110 also amplifies the signal for transmission by the antenna 30.

The system 1 operates in a substantially similar manner to provide pager message service when the pager 5 is detached from the handset 10. When detached, the controller 140 in the pager 5 causes the first switch 160 to connect the antenna 65 to the transceiver 180. The controller 140 and transceiver 180 would then operate to provide the demodulated and decoded signals to the controller 140 which displays the corresponding message on the display 45. The system 1 also enables the pager 5 to be a two-way pager. For instance, in reply to a pager message requesting a response, the controller 140 can process response instructions from the keypad 40 entered by a subscriber into a digital signal. The reply digital signal is provided to the DSP 130 which encodes the signal. The encoded signal is then provided to the transmitter 110. The transmitter 110 modulates and amplifies the encoded signal for transmission by the corresponding coupled antenna 65.

The telephone memory 230 can contain mobile terminal identification information used by the system 1 to establish communications with a wireless telephone service provider. Such identification information can be a conventional cellular telephone number assignment module (NAM) information which includes the telephone number (MIN) used to establish communications with the system 1 as well as the system identification (SID) of the cellular service provider that provides telephone service to the system 1. Additional NAM information includes the access overload class, group identifier mark, initial paging channel, wake up message and lock code. Other mobile terminal identification information can include, for example, internet protocol address, or other address or identification information related to an information appliance.

Since the telephone identification information is stored in the telephone handset, namely in the memory 230, the system 1 advantageously enables the pager 5 to be mounted to different handsets substantially identical to the handset 10 and to establish wireless telephone communications for respective telephone numbers associated with those handsets. In the alternative, the telephone identification information can be contained in the pager memory 145. In such an instance, if the pager 5 were connected to different telephone handsets substantially identical to the handset 10 then the system can establish wireless telephone communications based on the telephone identification information associated with the pager 5.

Moreover, it is possible for portions of the telephone identification information to be contained in the respective pager memory 145 as well as the telephone memory 230. Such an embodiment is useful, for example, when particular identification information is common to the pager and telephone services then the common information can be stored in the pager memory 145 while the remaining telephone identification information is stored in the memory 230.

Although several embodiments of the invention have been described in detail above, many modifications can be made without departing from the teaching thereof. All of such modifications are intended to be encompassed within the following claims. For instance, it is possible to use separate displays in the pager 5 and the handset 10. Moreover, although the depicted switch 150 enables coupling of either antennas 30 or 65 to the transceiver 180, it is also possibly to use an alternative embodiment according to the invention having both antennas 30 and 65 coupled to the transceiver 180 to provide signal diversity of received signals as well as using only the telephone handset antenna 30 for transmission.

The invention claimed is:

1. A radio telephone and pager system comprising:
   a radio telephone having at least one contact; and
   a pager having at least one mounting mechanism to detachably mount the pager to the handset, the pager having at least one contact corresponding to the handset contact to provide a signal interface between the pager and the handset, the pager further having a transceiver coupled to the pager contact wherein the transceiver is operable to provide messaging signals to the pager, and when the pager is mounted to the handset, the transceiver is operable to provide radio telephone signals to the handset and messaging signals to the pager.

2. The system of claim 1 wherein the pager has a display operable to provide user information for pager service, and for radio telephone service when the pager is mounted to the handset.

3. The system of claim 2 wherein a mounting position for the pager on the handset is disposed between an earpiece and a mouthpiece of the handset.

4. The system of claim 1 wherein said pager is rotatably mountable to said handset and when mounted, said pager rotates as a flip element.

5. The system of claim 1 further comprising a first power supply disposed in the pager.

6. The system of claim 1 further comprising a second power supply disposed in the handset.

7. The system of claim 1 wherein the transceiver is a time division multiple access transceiver.

8. The system of claim 7 wherein the transceiver is operable to provide telephone service and pager short messaging service in accordance with Telecommunications Industry Association and Electronic Industries Association Interim Standard 136.

9. The system of claim 7 wherein the transceiver is operable to provide telephone service and pager short messaging service in accordance with Global Speciale Mobile standard.

10. The system of claim 7 wherein the transceiver is operable to provide telephone service and pager short messaging service in accordance with Personal Handyphone System standard.

11. The system of claim 1 wherein the transceiver is a code division multiple access transceiver.

12. The system of claim 11 wherein the transceiver is operable to provide telephone service and pager short messaging service in accordance with the Telecommunications Industry Association and Electronic Industries Association Interim Standard 95.

13. The system of claim 1 further comprising a memory contained in said telephone handset containing at least a portion of mobile terminal identification information.

14. The system of claim 1 further comprising a memory contained in said pager containing at least a portion of mobile terminal identification information.

15. A pager comprising:

a transceiver; and a housing containing the transceiver, the housing having at least one contact and at least one mounting mechanism, the housing being detachably mountable to a radio telephone handset by the mounting mechanism, the contact being coupled to the transceiver and arranged on the pager to couple to corresponding contacts on the handset, wherein the transceiver is operable to provide messaging signals to the pager, and when mounted to the handset, the transceiver is operable to provide messaging signals to the pager and radio telephone signals to the handset.

16. The pager of claim 15 wherein the transceiver is a time division multiple access transceiver.

17. The pager of claim 16 wherein the transceiver is operable to provide telephone service and pager short messaging service in accordance with the Telecommunications Industry Association and the Electronic Industries Association Interim Standard 136.

18. The pager of claim 16 wherein the transceiver is operable to provide telephone service and pager short messaging service in accordance with Global Speciale Mobile standard.

19. The pager of claim 16 wherein the transceiver is operable to provide telephone service and pager short messaging service in accordance with Personal Handyphone System standard.

20. The pager of claim 15 wherein the transceiver is a code division multiple access transceiver.

21. The pager of claim 20 wherein the transceiver is operable to provide telephone service and pager short messaging service in accordance with the Telecommunications Industry Association and the Electronic Industries Association Interim Standard 95.

22. The pager of claim 15 further comprising a memory contained in said pager containing at least a portion of mobile telephone identification information.

\* \* \* \* \*